(12) United States Patent
Shimizu

(10) Patent No.: US 6,170,547 B1
(45) Date of Patent: Jan. 9, 2001

(54) PNEUMATIC RADIAL TIRE WITH HELICAL BELT LAYER

(75) Inventor: Akiyoshi Shimizu, Kodaira (JP)

(73) Assignee: Bridgestone Corporation, Tokyo (JP)

(*) Notice: Under 35 U.S.C. 154(b), the term of this patent shall be extended for 0 days.

(21) Appl. No.: 09/254,020

(22) PCT Filed: Jun. 30, 1998

(86) PCT No.: PCT/JP98/02922
§ 371 Date: Feb. 26, 1999
§ 102(e) Date: Feb. 26, 1999

(87) PCT Pub. No.: WO99/00261
PCT Pub. Date: Jan. 7, 1999

(30) Foreign Application Priority Data

Jun. 30, 1997 (JP) .................................... 9-174698

(51) Int. Cl.[7] .............................. B60C 9/20; B60C 9/22
(52) U.S. Cl. .................................... 152/533; 156/117
(58) Field of Search .................... 152/533, 531; 156/117

(56) References Cited

U.S. PATENT DOCUMENTS 3,802,982 * 4/1974 Alderfer ........................ 152/533 X
3,979,536 * 9/1976 Neville et al. .................. 152/533 X
5,379,818 * 1/1995 Suzuki et al. .................... 152/531

FOREIGN PATENT DOCUMENTS 4-331604  11/1992  (JP) .
5-278411  10/1993  (JP) .
5-278412  10/1993  (JP) .

* cited by examiner

Primary Examiner—Adrienne C. Johnstone
(74) Attorney, Agent, or Firm—Sughrue, Mion, Zinn, Macpeak & Seas, PLLC

(57) ABSTRACT

A pneumatic radial tire (20) comprises a radial carcass (22) of at least one ply, and a reinforcing belt (23) arranged on the outer peripheral side of the radial carcass (22). The reinforcing belt (23) is in the form of a helical belt layer (24) wherein a ribbon (40), which is comprised of a rubber (41) and a plurality of reinforcing cords (42) embedded in the rubber (41), is successively wound in a helical manner at an angle with respect to the circumferential direction of a tread portion. The ribbon (40) forming the helical belt layer (24) has a cross-section in which the reinforcing cords (42) are dispersed in the thickness and width directions of the ribbon (40).

11 Claims, 4 Drawing Sheets

FIG_4A PRIOR ART
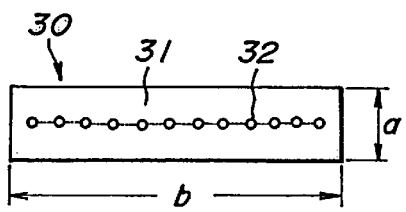
FIG_4B
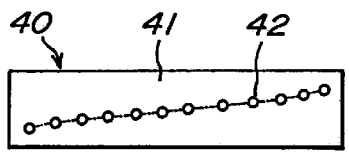
FIG_4C
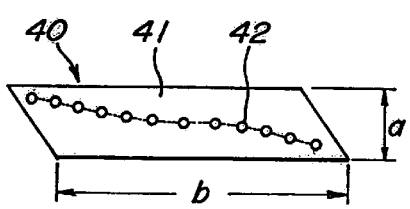
FIG_4D
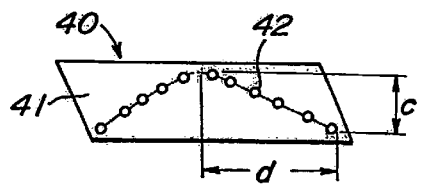
FIG_4E
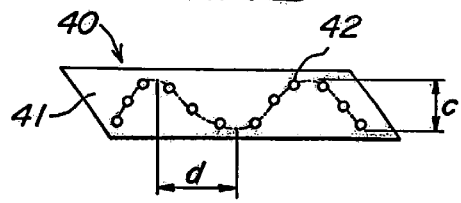
FIG_4F
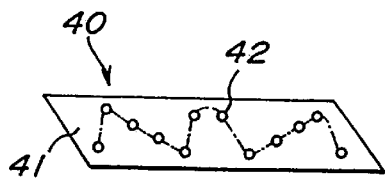
FIG_4G
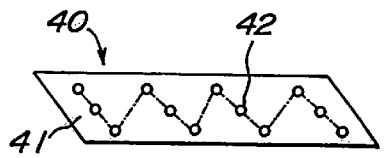
FIG_4H
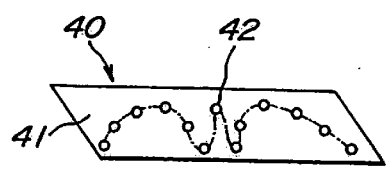
FIG_4I
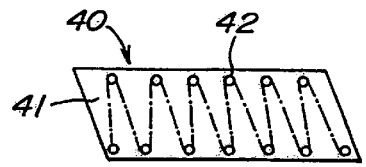

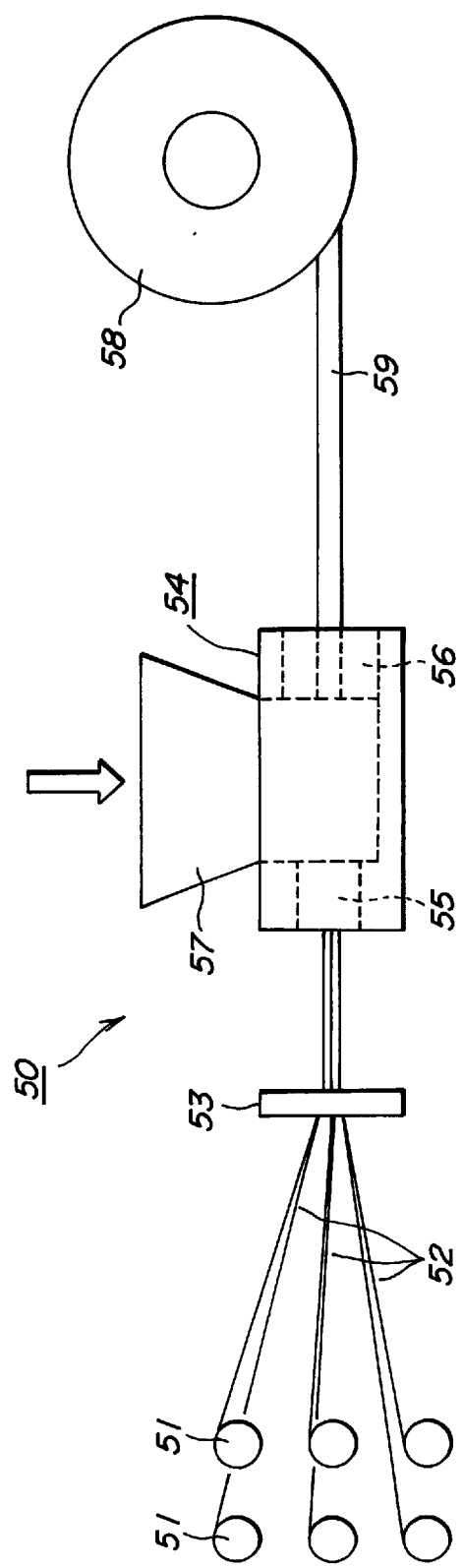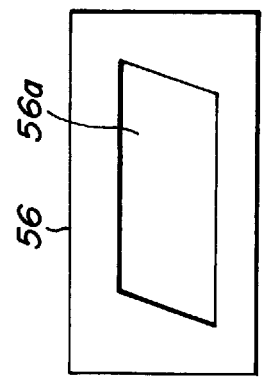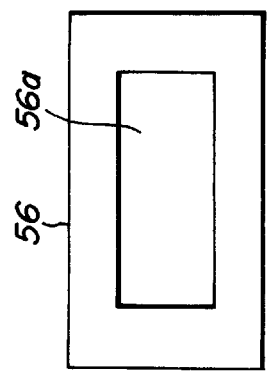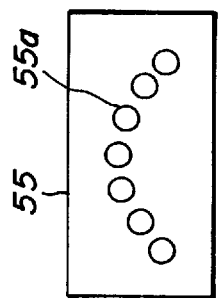

PNEUMATIC RADIAL TIRE WITH HELICAL BELT LAYER

FIELD OF THE INVENTION

The present invention relates to a pneumatic radial tire; in particular, it pertains to a pneumatic radial tire which is capable of suppressing irregular wear of the tread by an improved helical belt that is arranged on the outer peripheral side of the carcass.

BACKGROUND ART

The tread patterns of pneumatic radial tires are often determined mainly in view of the desired performance of the tire, such as maneuvering stability and wet performance. Also, it is conventional practice that the tread is formed with a plurality of grooves extending in the circumferential direction and widthwise direction of the tire, to thereby define discrete land portions in the form of blocks. In this instance, there is a tendency that the tread undergoes irregular wear. One may then consider that the block configuration can be modified for the purpose of preventing irregular wear of the tread, though such modifications are not practically carried out. This is because modification of the block configuration makes it difficult to preserve the maneuvering stability, wet performance and the like, which are required as the basic performance of the tire. Accordingly, it would be desirable to suppress irregular wear of the tread by improving the belt structure.

SUMMARY OF THE INVENTION

The present invention is based on recognition obtained with respect to pneumatic radial tires in which there is arranged, on outer peripheral side of a radial carcass, a winding layer or so-called helical belt layer wherein a ribbon comprised of a plurality of cords embedded in a rubber is successively wound in helical manner with a predetermined angle relative to the circumferential direction of the tread portion. In connection with such pneumatic tires, it has been conceived that the helical belt can be improved so as to effectively suppress irregular wear of the tread without modification of the block configuration.

The inventor thus conducted through investigations on the mechanism of occurrence of irregular wear of the tread portion, as well as countermeasures for suppressing and preventing the same. The result of such investigations can be summarized as follows.

First of all, it is considered that irregular wear of a tire tread portion due to the driving force occurs under the following causal relationship. That is, as illustrated in FIG. 1, attention is directed to the relative positional relationship between an arbitrary point P on the outermost layer 11 of a tire 10, i.e., a helical belt layer, and a point Q on the tread region which is intersected by a normal line of the outermost belt layer passing through the point P. In this case, when the tire 10 is applied with a driving force, the tread rubber 12 undergoes a shearing deformation within the ground contact surface so that a point $Q_1$ on the tread region, which is located on the normal line passing through a point $P_1$ on the belt layer 11 outside the ground contact surface, is shifted to a retracted point $Q_2$ in the ground contact surface, which is retraced rearwards of a point $P_2$ in the rotational direction R. That is the relationship indicated by the line segment $P_1$–$Q_1$, which is perpendicular to the belt layer 11 outside the ground contact surface, changes to the relationship indicated by the line segment $P_2$–$Q_2$, which is inclined relative to a normal line n intersecting the point $P_2$ on the belt layer 11 within the ground contact surface, during which the tread rubber 12 undergoes a shearing deformation. This relationship is maintained until immediately before the tread region comes out of the ground contact surface as shown by a line segment $P_3$–$Q_3$. Then, as soon as the tread region comes out of the ground contact surface, the tread rubber 12 is restored to the original state so that the relationship indicated by a line segment $P_4$–$Q_4$ is recovered wherein the point $Q_4$ on the tread region is located on the normal line intersecting the point $P_4$ on the belt layer 11 as is the case with the point $Q_1$, for the line segment $P_1$–$Q_1$. This recovery causes the shear strain of the tread rubber 12 to be rapidly released, thereby causing a sliding movement of the tread rubber 12 and a resultant increase in the wear amount of the edge portion, particularly at the kick-out side of the block. This is a main factor of so-called "heel-and-toe wear".

It can be therefore understood that, by reducing the shear strain of the tread rubber, which is caused immediately before the tread region comes out of the ground contact surface, it is possible to suppress the heal-and-toe wear. The inventor has experimentally confirmed that the deformation of the tread rubber caused immediately after the tread region steps into the ground contact surface does not significantly depend on the belt structure of the tire. Based on such recognition, the inventor found that the wear of the tread rubber can be suppressed by reducing the relative displacement between the outermost belt layer 11 and the tread, so that the shear strain indicated by the line segment $P_3$–$Q_3$ in FIG. 1 at the kick-out side of the tread region is reduced to the deformation which is indicated by the line segment $P_{3A}$–$Q_{3A}$ in FIG. 2.

Furthermore, the inventor noted that the tread portion undergoes a marked bending deformation in the vicinity of a portion which is applied with the load when the tire is pressed against the road surface, and the bending deformation causes a compressive deformation along a circumferential direction of the belt layer with a longitudinal center line of the tread portion as the center. The inventor then considered that, by arranging the outermost belt layer at a location spaced from the bending-neutral plane by as increased distance as possible, it would be possible to reduce the compressive deformation amount of the belt layer and thereby reduce the relative displacement between the outermost belt layer and the tread. Thus, in order to have the outermost belt layer arranged at a location spaced from the bending-neutral plane by as increased distance as possible, a trial has been conducted in which a rubber layer of approximately 1 mm in thickness was arranged between the outermost belt layer and the second belt layer as seen from the outer side, though an intended function could not have been achieved.

Investigations were further conducted with respect to the cause thereof, and it has been revealed that the compressive deformation of the outermost belt layer due to the bending deformation of the tread portion is absorbed by the deformation (so-called buffer deformation) of the belt layer arranged inside of the outermost belt layer, so that the outermost belt layer does not sufficiently undergo a compressive deformation. Thus, in order to suppress such buffer deformation of the rubber and arrange the outermost belt layer at a location spaced from the bending neutral plane by as increased distance as possible, a trial has been made in which a helical layer was formed by successively winding, helically in the axial direction of the tire, a ribbon comprised of a rubber layer of about 2 mm in thickness, for example, and cords which are dispersed within the rubber layer not only in the width direction thereof but also in the radial direction of the tire, in the manner to be more fully described below with reference to illustrated embodiments. As a result, it became possible to achieve a large compressive deformation of the outermost belt layer as indicated by outlined arrows in FIG. 2, and increase the compressive deformation amount by approximately 25% particularly in a region adjacent to the center of the ground contact surface. This is because the rubber material of the outermost belt layer is substantially divided by the cords and such arrangement of the cords contributes to suppression of the buffer deformation. Moreover, it has been found that, by suitably setting the distance between the peak and the bottom of the cord-arrangement, due to the dispersion of cords in the radial direction of the tire, there is no problem relating to the irregularity in the width direction, and advantageous functions are achieved in substantially the same manner as a single thick protection layer.

The present invention has been accomplished through the above-mentioned development process, and provides a pneumatic radial tire which comprises a radial carcass of at least one ply, and a reinforcing belt arranged on an outer peripheral side of the radial carcass, wherein the reinforcing belt has a helical belt layer in which a ribbon comprised of a rubber and a plurality of reinforcing cords embedded in the rubber is successively wound in helical manner, at an angle with respect to a circumferential direction of a tread portion, and wherein the ribbon forms the helical belt layer having a cross-section in which the reinforcing cords are dispersed in a thickness direction and a width direction of the ribbon.

In carrying out the present invention, it is preferred that a curve connecting both centers of the reinforcing cords, which are situated adjacent to each other in the width direction in the cross-section of the ribbon, has at least one peak and/or bottom as seen in the thickness direction of the ribbon. In this instance, the curve connecting the centers of the reinforcing cords preferably has at least one peak and at least one bottom, so that the cords are more effectively dispersed.

In order to effectively disperse the cord, it is preferred that the maximum dispersion of the reinforcing cords with respect to the thickness direction of the ribbon, i.e., the maximum distance between the highest peak and the lowest bottom in the radial direction of the tire, is set to be approximately 1 to 3 mm. Incidentally, the reason why the dispersion in the thickness direction of the ribbon is set to be within a range of approximately 1 to 3 mm is that a sufficient effect of the dispersion cannot be achieved in the case of less than approximately 1 mm, whereas the cords are excessively dispersed in the case of more than approximately 3 mm, thereby lowering the hoop effect and degrading the maneuvering stability.

Furthermore, it is preferred that a ratio of a widthwise center distance between the peak and bottom of the curve, which are adjacent to each other, to the maximum dispersion of the reinforcing cords in the thickness direction of the ribbon, is approximately 0.2 to 6, to optimize the dispersion of the cords.

It is also preferred that the ribbon has a cross-sectional shape which is in the form of a parallelogram. In this case, when the ribbon is successively wound in a helical manner in the axial direction of the tire, the surfaces of the side edge of neighboring turns of the ribbon can be brought in positive abutment with each other.

According to the present invention, the ribbon can be produced by continuously extruding a plurality of cords and a rubber through a mouthpiece having an extrusion orifice of 12 mm in width and 2 mm in height, for example, such that the cords are dispersed in the thickness and width directions of the ribbon. In order to disperse the cords in a predetermined arrangement form, all what is required is to provide a cord guide member having an opening or holes corresponding in diameter to the respective cords, on the upstream side of the mouthpiece. The ribbon thus obtained provides such functional advantages as realization of a desired arrangement of the cords at a high degree of freedom, improvement in adhesion between the rubber and cords thereby preventing separation, in contrast to conventional ribbon obtained by calendar rolls in order to unite a plurality of cords to a rubber sheet.

In a pneumatic radial tire according to the present invention, it is preferred that the reinforcing cords are comprised of organic fibers. In this connection, since the present invention serves primarily to improve the helical belt layer, the belt layer arranged on the radially inner side of the helical belt layer at a predetermined inclination angle with reference to the circumferential direction may be comprised of either organic fiber cords or steel cords.

DETAILED DESCRIPTION OF THE DRAWINGS

FIG. 4A is a cross-sectional view of a conventional ribbon;

FIGS. 4B to 4I are cross-sectional views showing various embodiments of the ribbon to be used for tires according to the invention;

FIG. 5 is a diagram showing a preferred embodiment of production line for producing the ribbon to be used for tires according to the invention;

FIG. 6 is a front view showing one example of the insert guide in the production line;

FIG. 7 is a front view showing one example of the die plate in the production line; and FIG. 8 is a front view showing another example of the die plate in the production line.

BEST MODE FOR CARRYING OUT THE INVENTION

One preferred embodiment of the pneumatic radial tire according to the invention will be described below with reference to the drawings.

Figure 1:
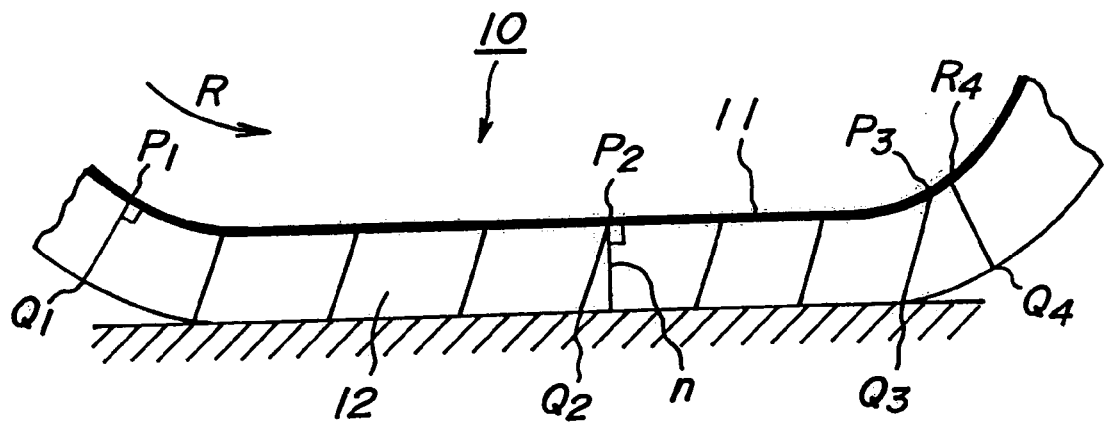
FIG. 1 is a schematic explanatory view for explaining the deformation of a tread region at the ground contact portion when a tire having a conventional helical belt is applied with a driving force.
Figure 2:
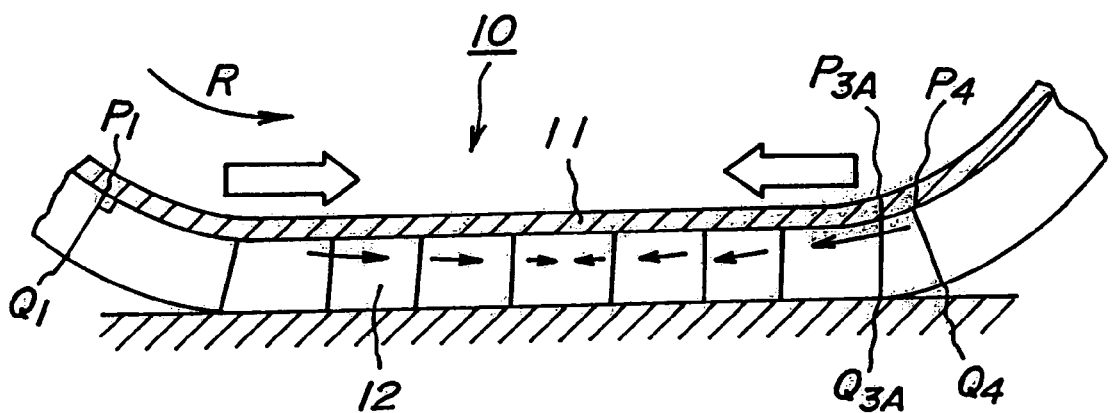
FIG. 2 is a schematic explanatory view for explaining the deformation of a tread region at the ground contact portion when a tire having a helical belt according to the present invention is applied with a driving force.
Figure 3:
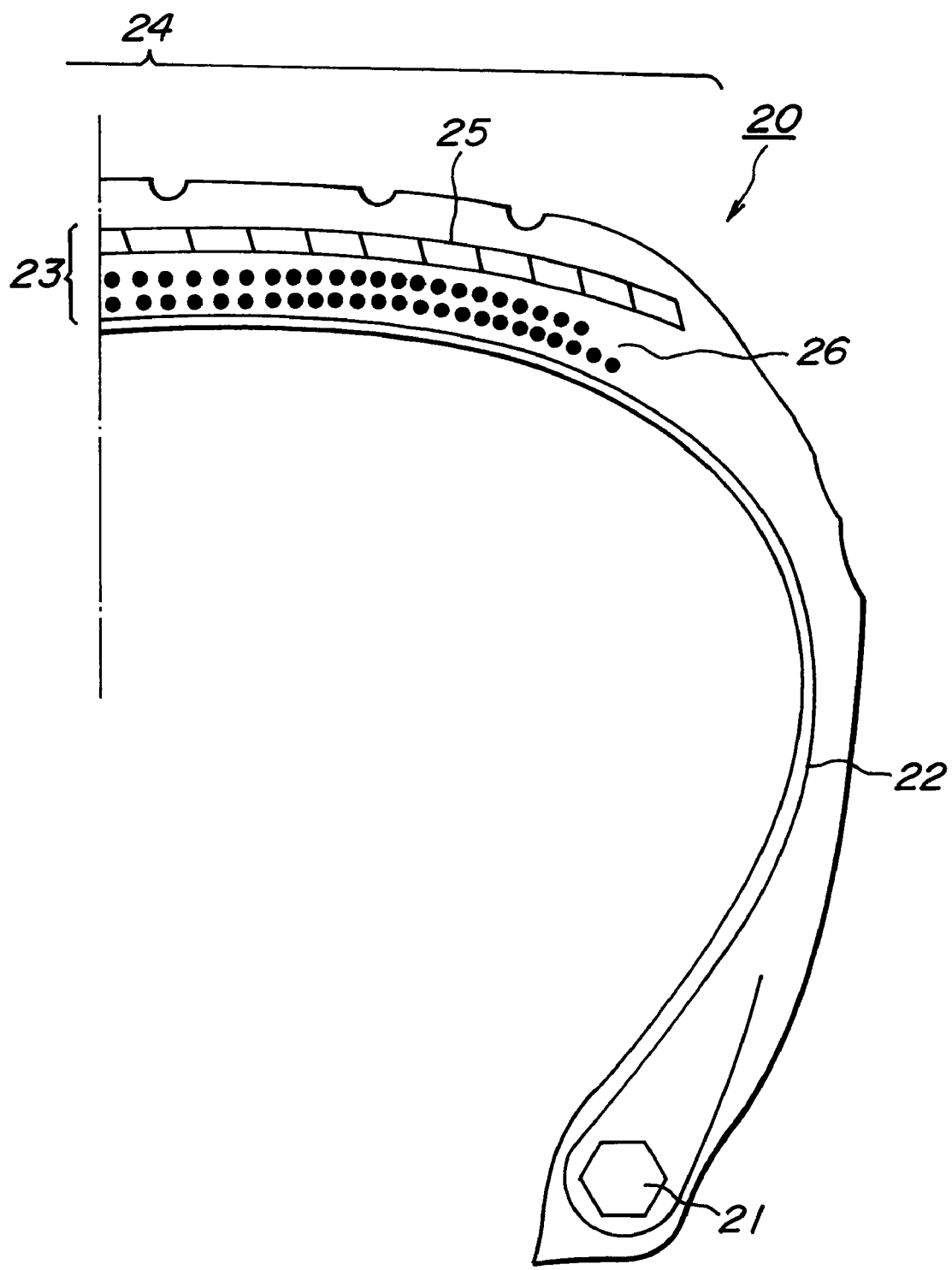
FIG. 3 is a meridional-sectional view of a pneumatic radial tire to which the present invention can be applied.

There is shown in FIG. 3 a meridional-sectional view of a pneumatic radial tire to which the invention can be applied, having a size of 225/50ZR16, for example. The tire, designated as a whole by reference numeral 20, comprises a pair of bead cores 21 (only one of which is shown), a radial carcass 22 of at least one ply which bridges between the bead cores 21, and a reinforcing belt 23 which is arranged on outer peripheral side of the radial carcass 22. The reinforcing belt 23 comprises a helical belt layer 25 and a laminated belt layer 26 arranged on radially inner side of the helical belt layer 25. The helical belt layer 23 includes a ribbon which is comprised of a rubber and a plurality of cords embedded in the rubber, preferably organic fiber cords such as nylon cords, and which is successively wound in a helical manner at an angle with reference to the circumferential direction of the tread portion 24. On the other hand, the laminated belt layer 26 includes two rubber-coated steel cord layers, each of which is comprised of a rubber and a plurality of steel cords embedded in the rubber. These steel cord layers are laminated one above the other such that the cords extend at an acute angle with reference the circumferential direction of the tire, in opposite directions to each other with reference to the equatorial line of the tire. Although not shown in the drawing, the tread pattern is basically block pattern.

The ribbon constituting the helical belt layer 25 is formed by continuously extruding a plurality of nylon cords and an unvulcanized rubber through a mouthpiece which includes an extrusion orifice of, for example, 12 mm in width and 2 mm in height, as will be described hereinafter. In this case, there may be arranged 50 nylon cords of 1260 d/2, per 50 mm with respect to the direction which is perpendicular to the longitudinal direction of the cords.

As shown in FIG. 4A, the ribbon 30 constituting a conventional helical belt layer includes a plurality of reinforcing cords 32 coated with rubber 31 and dispersed in a straight manner in the width direction, in the cross-section of the ribbon 30. On the other hand, according to the present invention, the ribbon 40 constituting the helical belt layer includes cords 42 coated with rubber 41 and dispersed not only in the width direction but also in the thickness direction, in the cross-section of the ribbon 40. FIG. 4B shows Embodiment 1 in which the ribbon 40 has a rectangular cross-section and the cords 42 are arranged so as to extend upward to the right side, and FIG. 4C shows Embodiment 2 in which the ribbon 40 has a cross-section in the form of parallelogram and the cords 42 are arranged in the ribbon 40 so as to extend downward to the right side. Furthermore, FIGS. 4D to 4I show Embodiments 4 to 8 in which the ribbon 40 has a cross-section in the form of parallelogram and the cords 42 are arranged in the ribbon 40 in non-linear manner. In these cases, as seen in the cross-section of the ribbons 40, when the centers of the cords 42 adjacent to each other in the width direction are connected by a curve, the shape of such curve (i.e., cord pattern) may be arcuate as shown in FIG. 4D, or and alternating pattern with a plurality of peaks and bottoms as shown in FIGS. 4E to 4I. In these drawings, "a" designates the thickness of the ribbon, "b" the width of the ribbon, "c" the maximum dispersion of the cords in the thickness direction of the ribbon, and "d" the center distance of the peak and bottom which are adjacent to each other in the width direction of the ribbon. In the above-mentioned ribbon, it is preferred that the ratio d/c of the center distance "d" between the peak and bottom adjacent to each other in the width direction, to the maximum dispersion "c" the reinforcing cords is set to be within a range of 0.26 to 6.

In order to verify advantageous functions of the present invention, performance tests were conducted with respect to a control tire having a conventional helical belt as shown in FIG. 4A, and embodiment tires provided with helical belts according to the embodiments shown in FIGS. 4B to 4I, respectively. Each of the test tires has the same specification as those described with reference to FIG. 3, including a helical belt layer comprised of a ribbon in which 50 nylon cords of 1260 d/2 are arranged per 50 mm. The ribbon of the helical belt in each test tire has dimensions as shown in Table 1. Each test tire has been mounted on a rim of 7J–16 under an internal pressure of 240 kPa, and secured as a rear wheel onto a rear wheel drive type Japanese passenger car having an engine displacement of 3000 cc. Then, the car has been subjected to a running test of 1000 km along a comprehensive test road in a test course, with an increased driving force applied under an accelerated-wear condition. The performance has been evaluated by measuring the wear amount at the portion which exhibited the highest wear (the toe portion of a block which exhibited a heel-and-toe wear), and comparing the running distances per 1 mm in wear amount (wear resistance). The evaluated data is represented as normalized indices in Table 1, with the running distance of the control tire per 1 mm in wear amount (wear resistance) assumed to be 100.

TABLE 1

|  | a (mm) | b (mm) | c (mm) | d/c | wear Index |
|---|---|---|---|---|---|
| Control | 0.7 | 12 | 0 | 0 | 100 |
| Embodiment 1 | 2 | 12 | 1.8 |  | 110 |
| Embodiment 2 | 2 | 12 | 1.8 |  | 110 |
| Embodiment 3 | 2 | 12 | 1.8 | 3.3 | 115 |
| Embodiment 4 | 2 | 12 | 1.8 | 1.7 | 125 |
| Embodiment 5 | 2 | 12 | 1.8 | 1.7 | 125 |
| Embodiment 6 | 3 | 12 | 1.8 | 2.1 | 132 |
| Embodiment 7 | 3.5 | 12 | 3.3 | 0.9 | 135 |
| Embodiment 8 | 3 | 12 | 2.8 | 0.4 | 135 |

It can be appreciated from Table 1 that the tires according to the present invention defined by the embodiments exhibit improved wear resistance as compared to the control tire. It can be also recognized that the embodiment tires 7, 8 are equivalent in terms of wear index, though the embodiment tire 8 exhibits a maneuvering stability which is improved to some extent as compared to the embodiment tire 7.

As described above, the ribbon constituting the conventional helical belt layer (FIG. 4A) is generally produced by uniting a plurality of cords to a rubber sheet by means of calendar rollers, whereas the ribbon constituting the helical belt layer according to the invention (FIGS. 4B to 4I) can be produced at a higher productivity by the process and production line described below.

A production line 50 is shown in FIG. 5, in which cords 52 each substantially straight along its length, are supplied from a plurality of bobbins 51 corresponding in number to the cords, and these cords 52 are guided to an insulation machine 54 through a comb-like guide member 53. The insulation machine 54 is detachably provided with an insert guide member 55 at its inlet and a mouthpiece 56 at its outlet, and further with a introduction port 57 for unvulcanized rubber at the center upper portion thereof. A ribbon-winding device 58 is arranged at a location on the downstream side of the insulation machine 54, for temporarily winding a ribbon 59 which has been extruded from the insulation machine 54.

The insulation machine 54 in the above-mentioned production line 50 may be of such type which is not equipped with an extruding screw. This is because the winding speed of the ribbon 59 can be adjusted depending upon the elasticity and adhesiveness (or tackiness) of the rubber, in order to allow the extrusion of rubber to be adequately controlled. The insert guide member 55 disposed at the inlet of the insulation machine 54 is formed with a plurality of holes arranged according to the desired pattern of the cords in the ribbon 59 to be produced. For example, the insert guide 55 shown in FIG. 6 is formed with a plurality of holes 55a having substantially the same pattern as the cords 42 of the ribbon 40 shown in FIG. 4d. Moreover, while the comb-like guide member 53 arranged at a location on the upstream side of the insert guide member 55 aims to prevent premature wear of the insert guide member 55 due to the friction with the cord 52, it may be omitted depending upon the positional relationship between the bobbins 51 and the insert guide member 55. On the other hand, the mouthpiece 56 arranged at the outlet of the insulation machine 54 has an orifice 56a of about 12 mm in width and about 2 mm in height, for example. The orifice 56a has a cross-section which is rectangular (FIG. 7) when the ribbon shown in FIG. 4b is to be produced, and which is in the form of parallelogram when the ribbons shown in FIGS. 4c to 4I are to be produced. Moreover, the ribbon extruded from the insulation machine may be directly wound on a green tire, with the winding apparatus omitted.

With the production line of the above-mentioned arrangement, a plurality of the cords unwound from the bobbins are guided to the insulation machine through the comb-like guide member, are arranged by the insert guide member into the same pattern as the holes thereof, and are then passed through the inside of the insulation machine. At the same time, unvulcanized rubber is supplied thereto through the introduction port at the upper center of the insulation machine such that the cords arranged into the desired pattern are coated by unvulcanized rubber. Further, the unvulcanized rubber coating the cords is shaped into a desired cross-section, for example, rectangular or parallelogram cross-section. The so-produced ribbon is continuously wound on the winding device. It is a matter of course that the insert guide and the mouthpiece may be detachably arranged at the inlet and the outlet of the insulation machine, so as to be exchangeable depending upon the desired pattern of the cords the desired cross-sectional shape of the ribbon.

It will be appreciated from the foregoing detailed description that, according to the invention, the helical belt arranged on the outer peripheral side of the carcass can be improved to realize a pneumatic radial tire which is capable of effectively suppressing occurrence of irregular wear of the tread portion, particularly when the tire is applied with a driving force.

What is claimed is:

1. A pneumatic radial tire comprising, a radial carcass (22) of at least one ply, and a reinforcing belt (23) arranged on an outer peripheral side of said radial carcass (22), said reinforcing belt having a helical belt layer (24) in which a ribbon (40) comprised of a rubber (41) and a plurality of reinforcing cords (42) embedded in said rubber (41), each reinforcing cord (42) being substantially straight along its length, is successively wound in helical manner, at an angle with respect to a circumferential direction of a tread portion, wherein:

said ribbon (40) forming said helical belt layer (24) has a cross-section in which said reinforcing cords (42) are dispersed in a thickness direction and a width direction of the ribbon (40).

2. A pneumatic radial tire according to claim 1, wherein a curve connecting both centers of the reinforcing cords (42), which are situated adjacent to each other in the width direction in the cross-section of said ribbon (40), has at least one peak and/or bottom as seen in the thickness direction of the ribbon (40).

3. A pneumatic radial tire according to claim 1, wherein the maximum dispersion (c) of said reinforcing cords (42) in the thickness direction of the ribbon (40) is approximately 1 to 3 mm.

4. A pneumatic radial tire according to claim 3, wherein a ratio (d/c) of a widthwise center distance (d) of said peak and said bottom of said curve, which are adjacent to each other, to said maximum dispersion (c) of the reinforcing cords (42) in the thickness direction of the ribbon (40), is approximately 0.2 to 6.

5. A pneumatic radial tire according to claim 1, wherein the cross-section of said ribbon (40) is in the form of parallelogram.

6. A pneumatic radial tire according to claims 1, wherein said reinforcing cords (42) are organic fiber cords.

7. A pneumatic radial tire comprising; a radial carcass (22) of at least on ply, and a reinforcing belt (23) arranged on an outer peripheral side of said radial carcass (22), said reinforcing belt having a helical belt layer (24) in which a ribbon (40) comprised of a rubber (41) and a plurality of reinforcing cords (42) embedded in said rubber (41) is successively wound in helical manner, at an angle with respect to a circumferential direction of a tread portion, wherein said ribbon (40) forming said helical belt layer (24) has a cross-section in which said reinforcing cords (42) are dispersed in a thickness direction and a width direction of the ribbon (40), and wherein the maximum dispersion (c) of said reinforcing cords (42) in the thickness direction of the ribbon (40) is approximately 1 to 3 mm.

8. A pneumatic radial tire according to claim 7, wherein a ratio (d/c) of a widthwise center distance (d) of said peak and said bottom of said curve, which are adjacent to each other, to said maximum dispersion (c) of the reinforcing cords (42) in the thickness direction of the ribbon (40), is approximately 0.2 to 6.

9. A pneumatic radial tire according to claim 7, wherein the cross-section of said ribbon (40) is in the form of parallelogram.

10. A pneumatic radial tire according to claim 7, wherein said reinforcing cords (42) are organic fiber cords.

11. A pneumatic radial tire according to claim 7, wherein a curve connecting both centers of the reinforcing cords (42), which are situated adjacent to each other in the width direction in the cross-section of said ribbon (40), has at least one peak and/or bottom as seen in the thickness direction of the ribbon (40).

* * * * *